(12) United States Patent
Schindler

(10) Patent No.: US 7,647,137 B2
(45) Date of Patent: Jan. 12, 2010

(54) UTILITY DEMAND FORECASTING USING UTILITY DEMAND MATRIX

(75) Inventor: Zdenek Schindler, Prague (CZ)

(73) Assignee: Honeywell International Inc., Morristown, NJ (US)

( * ) Notice: Subject to any disclaimer, the term of this patent is extended or adjusted under 35 U.S.C. 154(b) by 483 days.

(21) Appl. No.: 11/717,525

(22) Filed: Mar. 13, 2007

(65) Prior Publication Data

US 2008/0228325 A1     Sep. 18, 2008

(51) Int. Cl.
G05D 3/12      (2006.01)
G05B 11/01     (2006.01)
G06F 17/30     (2006.01)
G06F 7/00      (2006.01)

(52) U.S. Cl. .................. 700/291; 700/16; 715/963; 707/6; 707/104.1

(58) Field of Classification Search .......... 700/16, 700/83, 276, 286, 291, 296; 705/412; 715/963; 702/60–62; 707/3, 6, 104.1
See application file for complete search history.

(56) References Cited

U.S. PATENT DOCUMENTS 6,577,962 B1 * 6/2003 Afshari ................. 702/61
2009/0157529 A1 * 6/2009 Ehlers et al. ............ 705/26

* cited by examiner

Primary Examiner—Sean P Shechtman
(74) Attorney, Agent, or Firm—Kris T. Fredrick

(57) ABSTRACT

One embodiment of the application provides a method of forecasting utility demand of a utility consuming entity for a future time period. The method includes: selecting a utility demand matrix from a set of utility demand matrixes as a function of a future date, wherein the set of utility demand matrixes are classified by type-of-day, and representing a relation of past utility demand of the entity to time-in-day interval and outdoor temperature in the vicinity of the entity during the type-of-day; identifying a utility demand element from the utility demand matrix as a function of a future time-in-day and a known factor (e.g., future outdoor temperature) thereof; and generating a utility demand forecast of the entity for the future time period as a function of the identified utility demand element.

22 Claims, 8 Drawing Sheets

UTILITY DEMAND FORECASTING USING UTILITY DEMAND MATRIX

CROSS-REFERENCE TO RELATED PATENT DOCUMENTS

This application is related to U.S. application Ser. No. 11/365,184, filed Mar. 1, 2006, which is incorporated herein by reference.

TECHNICAL FIELD

The present application relates generally to the technical field of forecasting of utility demand, and more particularly, to a system and method for forecasting utility demand.

BACKGROUND

Typically, the utility demand (demand for electricity, natural gas, heating, cooling, etc.) of buildings and building complexes, like hospitals, office buildings, military bases, campuses, etc., depends on three principle factors: time of day during which the utility demand is occurring; the "type" of day (weekday, workday, holiday, etc.) when the utility demand is occurring; and the weather conditions, primarily outdoor temperature, existing at the time when the utility demand is occurring.

It is common for an energy company to include, in a billing statement, numerical data and/or graphical depictions of electricity and/or natural gas demand, on a monthly basis, for the previous twelve months. This allows a consumer to compare, for example, the electricity demand for January 2006 with the electricity demand for January 2005. This provides the consumer with information regarding the total electricity demand for an entire month and gives no detailed information regarding the outdoor temperature during that month, the weather conditions, and the like. Further, since the data is given on a per-month basis, daily profiles, temperature, different consumption patterns for holidays and weekends, etc. are not taken into account. It would be desirable to have a simple and transparent way of characterizing and forecasting utility demand with more detail than has previously been available.

BRIEF DESCRIPTION OF THE DRAWINGS

Some embodiments are illustrated by way of examples, and not by way of limitations, in the figures of the accompanying drawings in which.

DETAILED DESCRIPTION

In the following description, for purposes of explanation, numerous specific details are set forth in order to provide a thorough understanding of example embodiments. It will be evident, however, to one skilled in the art that the embodiments of the application may be practiced without these specific details.

Figure 1:
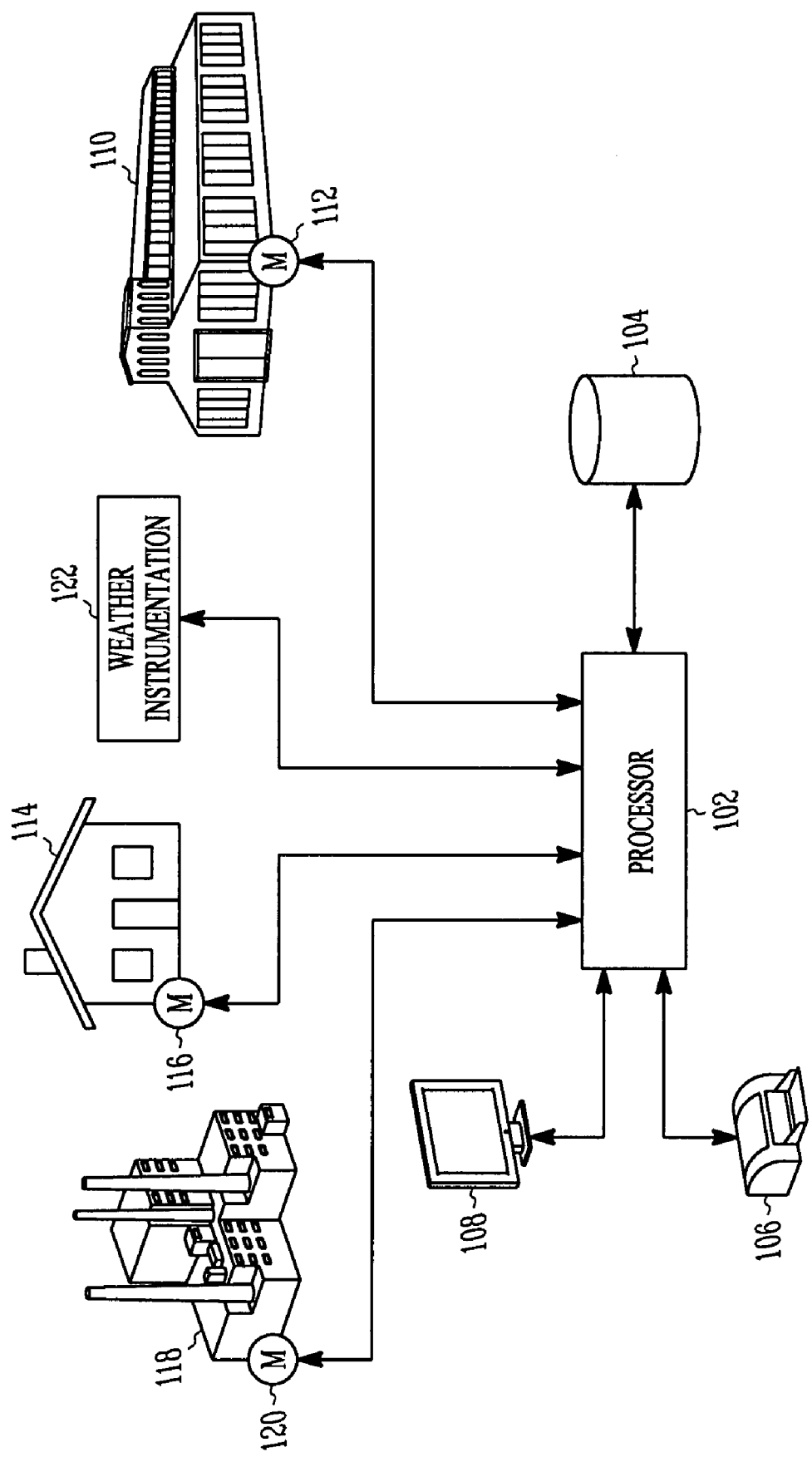
FIG. 1 is a block diagram illustrating an example of a general environment according to an example embodiment.

FIG. 1 is a block diagram illustrating an example of the general environment in which the present application is utilized and the various elements utilized to achieve the present application. In some embodiments, referring to FIG. 1, a processor 102 (for example, a PC, mainframe, or other known processing device) may be coupled to a data storage device 104, an input device 105, a printer 106, and a display device 108. A first structure (or energy consuming entity) 110 has a metering device 112 which monitors and records the amount of a particular utility, e.g., electricity, being consumed by the operation of structure 110. A second structure (or energy consuming entity) 114 has a similar metering device 116 associated therewith, and a third structure (or energy consuming entity) 118 likewise has a similar metering device 120 associated therewith. Each of the metering devices 112, 116, and 120 are coupled to processor 102 so that readings being taken by the metering devices are transmitted to the processor for processing and storage.

Weather instrumentation located in the vicinity of structures 110, 114, and 118 transmits weather data, e.g., outdoor temperature, humidity, wind speed and direction, and any other weather-related data readable by known weather instrumentation, to processor 102. Although a single weather instrumentation element is shown in FIG. 1, it is understood that multiple weather instrumentation elements may be provided, e.g., each structure can have its own set of weather instrumentation located in its vicinity if desired.

The configuration illustrated in FIG. 1 allows for the gathering of utility demand data from each of the structures 110, 114, and 118, as well as for the gathering of weather-related data for the areas around the structures, for processing by processor 102 as described more fully below. In a known manner, printer 106 enables the printing of information from processor 102, and display device 108 allows for information from processor 102 to be displayed thereon. Data storage device 104 enables the storage of data from processor 102 in a known manner.

Figure 2:
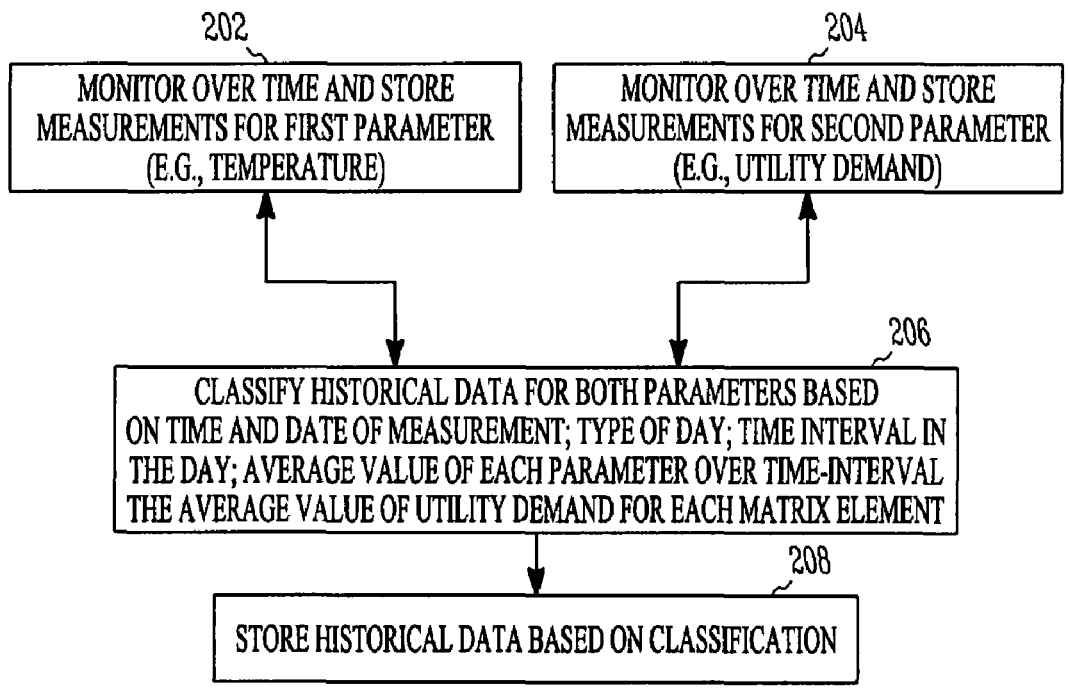
FIG. 2 is a flowchart illustrating an example of steps performed in gathering data for use in the creation of a historical database used to create a utility demand footprint according to an example embodiment.

FIG. 2 is a flowchart illustrating the gathering of data in the environment illustrated in FIG. 1, thereby enabling the creation of a historical database useable to create a utility demand footprint (UDF) in accordance with the present application. In some embodiments, referring to FIGS. 1 and 2, multiple monitoring actions occur simultaneously. At step 202, a first parameter, for example, outdoor temperature, is continuously monitored (or monitored periodically over a predetermined interval) by the weather instrumentation and data stored regarding that parameter in the storage device 104 associated with processor 102. The first factor may also be other factors, e.g., humidity, wind speed and direction, occupancy of a hotel or a hospital, etc. Simultaneously, at step 204, a second parameter, e.g., instantaneous electricity demand in kW, is continuously monitored (or in kWh periodically over a predetermined interval) and data is periodically stored in storage device 104 for that second parameter. While only two parameters are shown as being monitored in FIG. 2, it is understood that other parameters, e.g., weather conditions, different types of utilities, utility demand restricted to certain zones within a structure, etc., can also be monitored and data stored for those parameters in a similar manner.

For the purpose of this application, the term "utility demand" means an amount of utility delivered during a predetermined time period, e.g., daily, hourly, every quarter-hour, etc., related to the consumption of electricity, natural gas, fuel oil, and the like. Such activity will typically be based on the general consumption of such utilities, e.g., kWh of electricity. Existing meters can be monitored to provide this information. For natural gas, it may be desirable to calculate the total energy delivered by multiplying the amount of natural gas consumed by the calorific value of the gas.

For the purpose of this application, there are two primary time intervals of interest. The first is referred to as the "sampling interval" and refers to the increments of time (e.g., hourly) over which data samples are repeatedly taken. The second is referred to as the "footprint interval" and refers to the overall time covered by a particular UDF (e.g., summer; November-March; etc.) As the data is gathered, the date and pertinent sampling interval (e.g., 01:00:00 AM-02:00:00 AM) of the data measurements is recorded, e.g., using date and time stamps. The date and time stamping of the recorded data can be performed by processor 102 in a well-known manner. Further, processor 102 can be configured to correlate the date-stamp of the recorded data to calendar information in a well-known manner, to allow identification of the day of the week to which the data corresponds, whether or not it is a holiday, etc. This allows, at step 206, for the gathered data to be classified based on the time and date of the measurement; the type of day (e.g., weekday, holiday, weekend); a sampling interval in the day (e.g., between 1-2 pm); and the average value of each parameter over that sampling interval. In case of utility demand in kWh, the integral value of the demand during the sampling interval may also be calculated and stored. At step 208, all of this information (the data itself and the classification information for the data) is stored in a historical database on data storage device 104.

Figure 3:
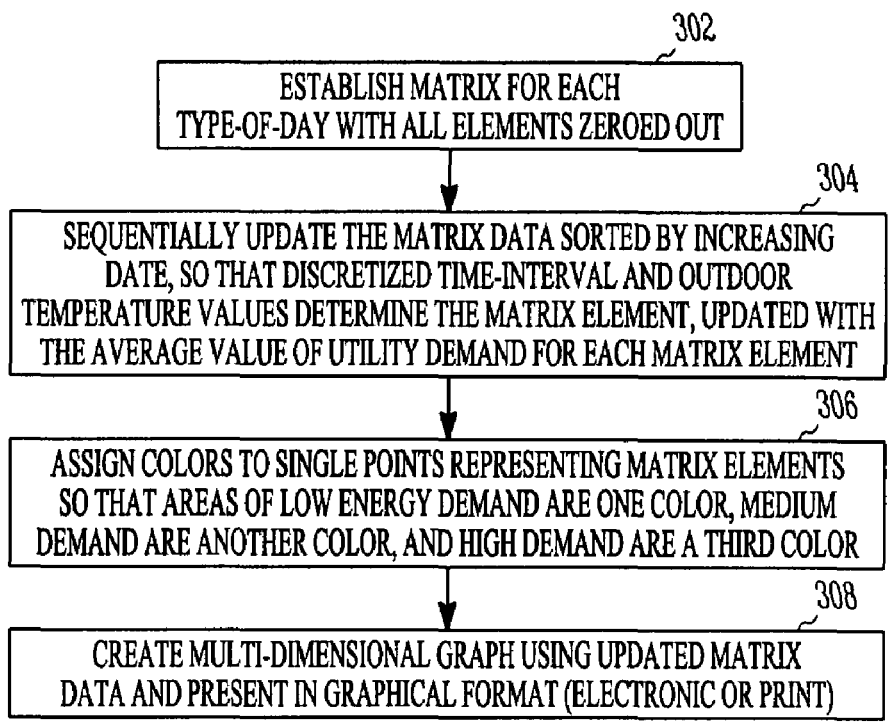
FIG. 3 is a flowchart illustrating an example of steps performed in the creation of a utility demand footprint according to an example embodiment.

FIG. 3 is a flowchart illustrating the creation of a UDF in accordance with one embodiment of the present application. At step 302, a matrix is established for each type-of-day with all elements zeroed out, to set normalized initial conditions for population of the matrices. A separate matrix is established for each type-of-day so that the data displayed in the UDF is representative of similar usage patterns, e.g., heavy utility use on weekdays when people are working in the structures (or energy consuming entities), reduced utility demand on weekends when fewer people are working in the structure and when energy-saving measures may be active, etc. At step 304, the matrix is sequentially updated with data sorted by increasing date, so that outdoor temperature values and time-of-day (the sampling intervals) determine the matrix element, updated with the average value of utility demand for each matrix element. For updating, smoothing based on age-of-data is performed so that more recent data is weighted more heavily than older data. Alternatively, equal weights to all data may be used. In one embodiment, a plain average of the past demands is obtained. The matrix then represents a two-dimensional histogram of demands. This modification (equal weights to all data) may be relevant for past UDF intervals, e.g., for the summer, 2003, where there is no reason to prefer August 2003 over June 2003 data. Exponential smoothing for example, may be used for current UDF interval, when we are interested in current UDF influenced by latest utility demand changes.

At step 306, colors may be assigned to single points representing time intervals and temperature intervals pertaining to matrix elements so that areas of low energy demand are one color, medium demand are another color, and high demand are a third color. In an embodiment, the energy demand values are assigned a color that gradually changes based on the demand value, e.g., the color transitions from dark green to yellow corresponding to a transition from a low to high demand value. This allows the graph to display a gradually changing color as the demand value increases or decreases, allowing easy identification of the character of the demand and changes to the demand by simply viewing the UDF. Any colors may be used; a transition from dark green to yellow as described herein is given for the purpose of example only. Finally, at step 308, a multi-dimensional graph (the UDF) is created using the updated matrix data and is presented in graphical format (electronic or printed). In further embodiments, other attributes for points, such as shading or grey scaling may be used.

A simple way to create the UDF is to draw a rectangular mesh in a two-dimensional plane, where each matrix element corresponds to a rectangle. Each rectangle may be colored in accordance with the value of the matrix element. A better footprint with smooth color transients is obtained if a surface is stretched over individual points that represent matrix elements. Each point is determined by three coordinates: x and y correspond to the matrix row and column indexes of the element; z corresponds to the value of the element. The surface may be constructed using any commonly known approximation technique, e.g., using triangular meshes, splines, etc. Then each point of the surface is colored according to its z-value.

Figure 5:
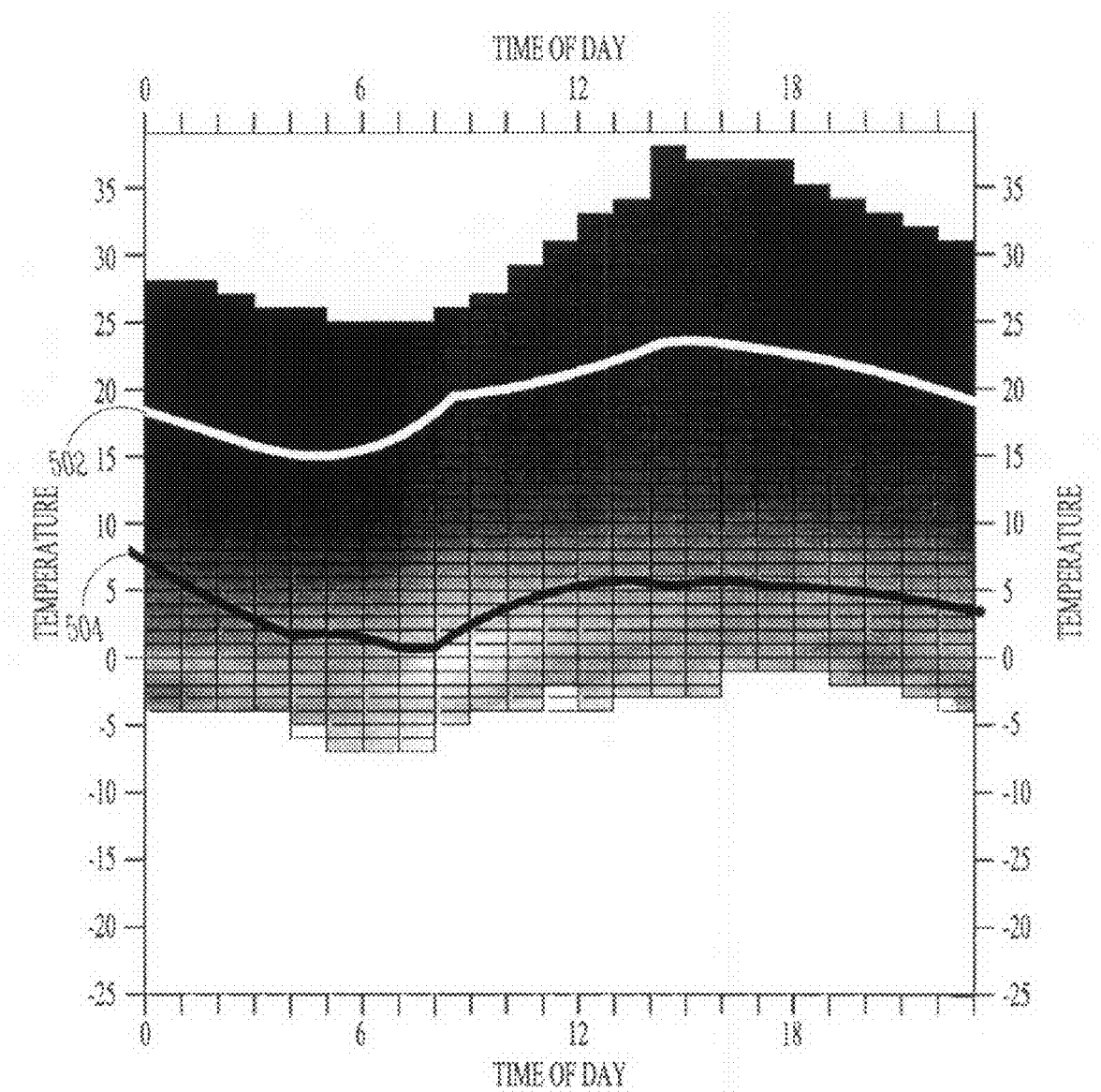
FIG. 5 is a simplified black-and-white example of another two-dimensional utility demand footprint according to an example embodiment, in which X-axis represents time-in-day and Y-axis represents outdoor temperature.
Figure 6:
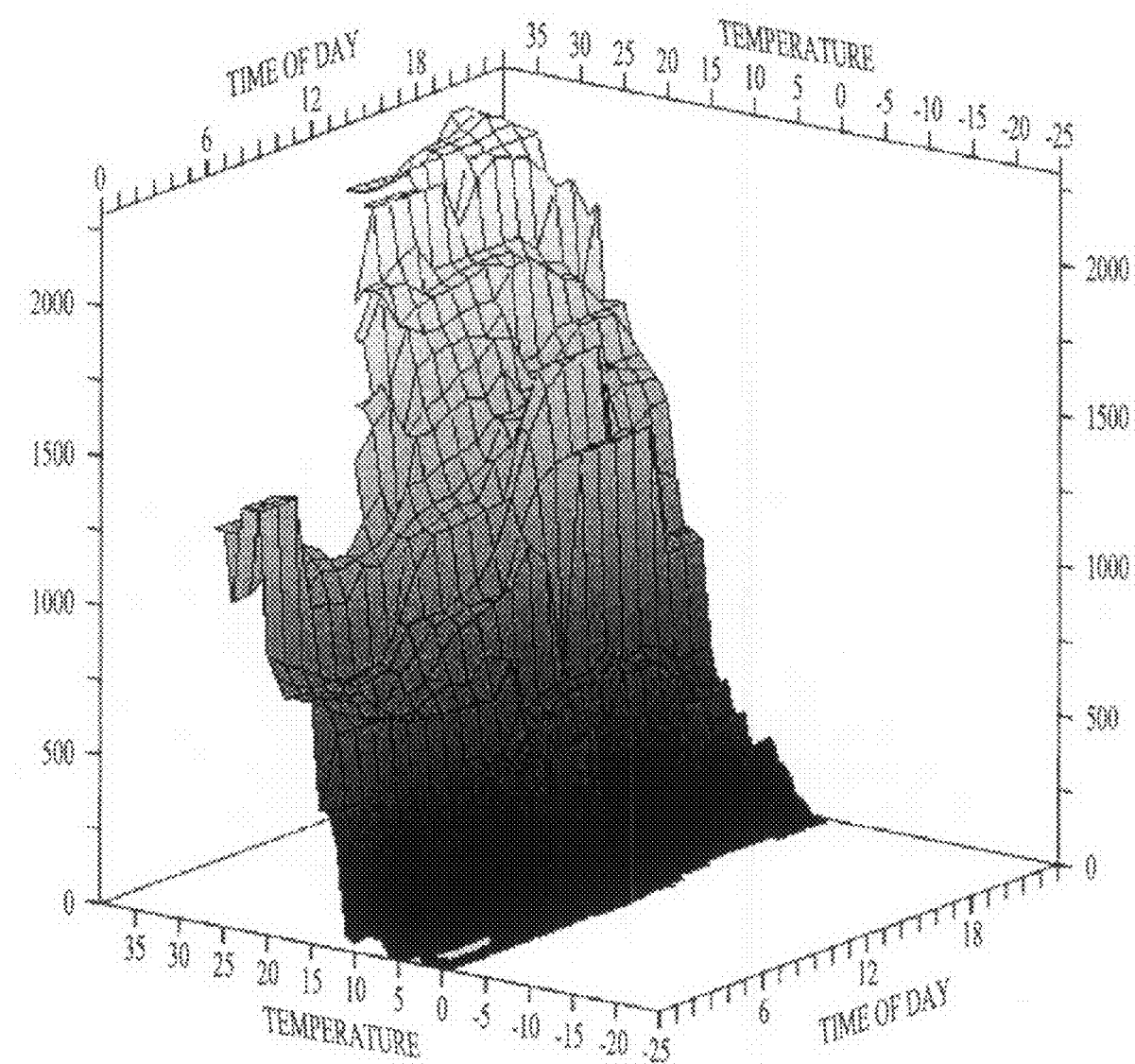
FIG. 6 is a simplified black-and-white example of a three-dimensional utility demand footprint corresponding to the two-dimensional utility demand footprint of FIG. 4.

The two-dimensional footprint is a projection of this colored surface on the x-y plane (see FIGS. 4 and 5), while the three-dimensional footprint is a general view on the surface from a suitable point in the space (see FIG. 6). Examples of each are described below.

Figure 4:
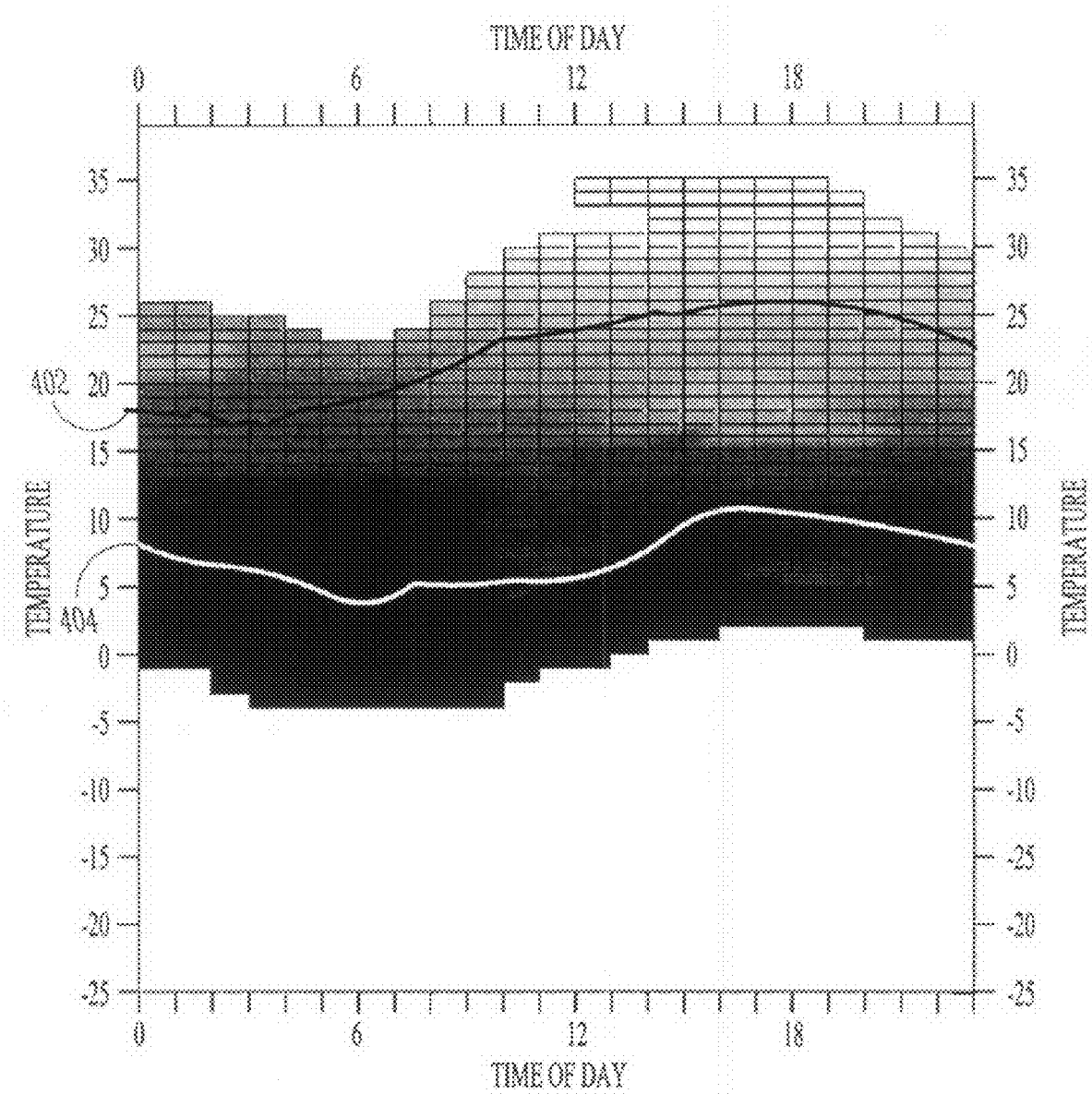
FIG. 4 is a simplified black-and-white example of a two-dimensional utility demand footprint according to an example embodiment, in which X-axis represents time-in-day and Y-axis represents outdoor temperature.

FIG. 4 is a simplified, black and white example of a UDF showing the demand for electricity in kWh during conditions when afternoon outdoor temperatures typically reach between 20 and 30° C. and sometime go as high as 35° C. In FIG. 4, X-axis represents time-in-day and Y-axis represents outdoor temperature, time-intervals of high electricity demand are white or almost white, time-intervals of low electricity demand are illustrated as very dark on the UDF and the time-intervals of medium demand are illustrated in gray shading. This same shading convention is used in FIG. 5, described below.

As can be readily seen from looking at the UDF of FIG. 4, the electricity demand increases for higher outdoor temperatures and for a constant temperature does not depend significantly on the time of day. The UDF tracks the temperature and utility demand over a 24 hour period in 1 hour sampling intervals.

As noted above, the UDF classifies utility demands and shows their dependence on the principle factor(s) of interest, e.g., outdoor temperature, using color for different levels of the demand either in an absolute or in a normalized scale. Further, the typical values for the principle factors of interest, outdoor temperatures in this example, can be delimited in the UDF by, for example, including upper and lower border curves 402 and 404, respectively, to show the typical upper and lower values. Those upper and lower values may be obtained by statistical evaluation of past stored values of the factor (e.g., temperatures) or may be derived from climatic historical data (issued by meteorologists). The UDF is built upon collected, stored, and statistically processed past and current utility demand data. The data collection is a result of periodically stored demand and weather values at the structure where the utility is being supplied.

FIG. 5 illustrates a UDF showing a typical footprint for electricity demand during a season when heating is required, X-axis represents time-in-day and Y-axis represents outdoor temperature. As can be seen, the demand for electricity is higher for lower outdoor temperatures, and reduced heating in the evening (e.g., due to the use of programmable set-back thermostats) and intensive heating in the morning are readily apparent.

In the example described above, the historic data for each UDF may be stored in the form of a five-dimensional vector consisting of the time and date of the measurement, type of the day (e.g., weekend, working day, holiday, etc.), time interval in the day (e.g., 1:00 PM-2:00 PM), total consumed energy in that time interval (e.g., 2564 kWh), average quantized value representing weather condition in that interval (e.g., 37° F.). It is understood that other measurements can be used and still fall within the scope of the present application.

As indicated above, when creating the UDF, first a matrix is established for each type of day with all elements equal to zero. This serves to establish initial values for the computation/algorithm. Then vectors of data, sorted by increasing date, sequentially populate the matrix. The matrix may be updated directly each time the complete five-dimensional vector is available. The sequential number of the time-in-day interval and outdoor temperature values (e.g., the outdoor temperature value rounded to the nearest integer) determine the matrix element (central element), which is populated with the average value of the utility demand for each type of day in the desired footprint interval. For example, if the footprint interval for a UDF being created is July-September, and the type-of-day for which the UDF is being created is a weekday, and historical data exists for the period January 2000 through December 2005, then the data for all weekdays occurring from July 1 through September 30 for the years 2002-2005 can be averaged, on an hour by hour basis (e.g., all of the 9:00-10:00 AM data is averaged, all of the 10:00 AM-11:00 AM data is averaged, etc.), and the results of the averages are displayed in the UDF.

This method (averaging) treats all data, regardless of age, as essentially equal in value. It is suitable for UDFs generated for past intervals, e.g., for the purpose of monitoring changes in the utility demand. For a current UDF, from a practical standpoint, in most cases data older than one year old can be excluded, since data older than that is typically not of interest. As noted above, and described in more detail below, exponential smoothing provides more meaningful information with respect to a current UDF than does plain averaging, because it assigns exponentially decreasing weight to all data—the older the data, the less the weight. It is preferable to use exponential smoothing for a current footprint, since it shows the current character of the demand which evolves on a day-to-day basis.

In an embodiment, the populating is done using an expression based on exponential smoothing in the age-of-data dimension that respects possible slow evolution of energy demand. The exponential smoothing (exponentially weighted moving average, or EWMA) model uses a weighted average of past and current values in a well-known manner, adjusting weight on current values to account for data aging. Using an exponential smoothing alpha coefficient term (between 0 and 1), one can adjust the influence of the smoothing effects. Thus, the method gives more weight to recent values than to old values, and the weight exponentially decreases with the age of the data. An example of how weighting recent values more heavily can be beneficial is a situation where energy-saving improvements have been made to a building for which a UDF is being created. More recently-gathered data will be more likely to give an accurate depiction of the current utility demand, since the more recent data will reflect the demand with the energy-saving measures in place, while data gathered before the energy-saving measures were implemented will skew the portrayal of the demand data away from what the current demand really is.

Other elements within a certain neighborhood of the relevant matrix element may be updated using another weighting constant, which is a function of the distance between updated elements and their relevant matrix element. Different metrics defining the distance of two matrix elements may be used. The radius of the neighborhood may be zero; then no other matrix element except the relevant matrix element is updated. Weighted symmetric averaging in time-of-day and temperature dimensions are used to further suppress noisy character of data. Exponential smoothing smoothes data in the time dimension. It means that it more or less eliminates random fluctuations in data.

This "neighborhood updating" may be useful because if only the central element is updated, the potential exists for the UDF to still be too "turbulent". Therefore, the influence of a single update can be "scattered" also onto other surrounding matrix elements. However, the weight of the updates to the neighboring matrix elements is lower than the weight of updating for the central element. The weight for updating neighboring matrix elements can be dependent on the distance of the neighboring element from the central element. For example, for a sampling interval of 4:00-5:00 AM, when it is 12° C., and where 4256 kWh, if electricity is consumed during that sampling interval, a corresponding central element with coordinates M[5,42]=4150 can be located and updated with the value 4256 using exponential smoothing expression for chosen alpha coefficient. This updates the value at M[5,42].

In addition, neighboring elements M[4,41], M[4,42], M[4,43], M[5,41], M[5,43], M[6,41], M[6,42], M[6,43] can also be updated. As can be seen, all elements that differ by not more than one coordinate in each direction are updated, yet with less weight. Of course, if desired the influenced neighborhood could be extended further, e.g., to +/−2 in each direction. This weight is independent of exponential smoothing weight and may be, e.g., linearly dependent on the difference of indexes of updated elements and central elements. Exponential smoothing weight is dependent on the age of data and is determined by the alpha coefficient. Data updating the matrix are weighted twice—once in dependence on their age and then in dependence on the distance from the central elements. The distance from center weight is applied explicitly. The age-of-data weight is applied implicitly by a recursive formula that is part of the exponential smoothing method. Exponential smoothing is a computationally efficient way to apply exponentially decreasing weight. The essence of this is a recursion.

The following example illustrates the operation of the present application. In this example it is presumed that a historical database exists that stores utility demand data for electrical demand, natural gas demand, heating demand, and cooling demand. For the sake of simplicity, this example focuses on electrical demand; however, it is understood that numerous other elements of utility demand may be measured and utilized for preparation of a UDF in accordance with the present application.

For the purpose of this example, it is assumed that electrical demand data, as measured by an electric meter, has been stored in the historical database on an hourly basis, for the period Jan. 1, 2002 through the present. In this example, the data monitoring system reads the electrical demand of a particular building each hour (e.g., from 9:00:01 AM-10:00:00 AM; from 10:00:01 AM-11:00:00 AM, etc.) and transmits to the processor the electrical demand data gathered during that one-hour period (the sampling interval) upon the expiration of the one-hour period, e.g., at 10:00:03 AM. This most recent data reading is referred to herein as the "current data vector", and it is added, by the processor, to the historical data set, which comprises all of the other data except for the most recent data reading, i.e., except for the current data vector. The current data vector extends the historical database by the new data record, which represents the electrical demand during the last sampling interval (one hour in this example).

As the current data vector is transmitted and stored with the historical data set, it is time and date stamped so that it may be sorted based upon the date, the day of the week (e.g., Monday, Saturday, etc.), and the sampling interval during which it was recorded, just like the historical data. As noted above, the processor can be configured to identify specific dates, such as holidays, where it is anticipated that the electrical demand is likely to be different, depending upon circumstances. For example, it is common for buildings to significantly reduce the heat provided in the building on weekends and holidays to save on energy costs, and since there are typically fewer people in the building on weekends and holidays, the overall demand for electricity will also be significantly reduced. Accordingly, the processor can be configured to identify particular dates and/or times as being of a particular type of day (e.g., weekend and/or holidays). This allows a footprint to be created that is focused on electricity demands only for workdays, only for weekends and/or holidays, etc.

With the data gathered, stored (if needed), and classified in this manner, a footprint is created. To create a UDF, various parameters may be input to the processor by the user (e.g., via a keyboard or other input device) to limit the footprint to certain types of day or certain time periods, etc. The user may be as specific or generic as desired. For example, the user can simply input a footprint interval, e.g., November, 2004 through March, 2005, and a basic footprint, identifying electricity demands by each sampling interval (one hour sampling intervals in this example) can be created. The UDF will comprise a graph showing the typical electricity demand in relation to the outdoor temperature, on an hour-by-hour basis, irrespective of the type-of-day during the footprint interval.

For more resolution, the users can instead indicate that they would like to see a footprint for the same footprint interval, e.g., November, 2004 through March, 2005, but isolate the footprint to display average hourly demands only for workdays. Since the data is classified by type-of-day, this can be easily accomplished. The user may vary the footprint intervals, sampling intervals and types of day as desired to create any type of footprint, limited only by the manner in which the data has been classified in the historical database.

The footprint visualizes the matrix that is built from all data for a certain time interval, e.g., the user may make a winter footprint, a fall footprint, a summer footprint, etc. This allows the footprint to characterize the seasonal behavior of the building for the particular season, and allows different footprints to be compared to reveal different behavior of the demand in different seasons.

The footprint may be created from the historical database once and then printed and used as a chart characterizing the building utility demand in various seasons or for various day-types or time-periods. For the current season, the data is updated (hourly, in this example) and the footprint will continually evolve and reflect potentially changing actual behavior of the building over time.

As an alternative to printing out a chart for a particular UDF, the information for the current UDF (e.g., a footprint of the current season) can also be displayed graphically, for example, on a computer screen, and the system can be configured to update the displayed footprint based on the most recently gathered data. In the example above, this would mean that each hour the displayed footprint would be updated with the data from the most recent sampling interval.

Displaying the UDF on screen allows a UDF for a building to be constantly monitored to identify, in essentially real time, significant changes in utility demand which might warrant investigation. As the UDF represents "smoothed" data, random temporary changes in the demand do not directly appear in the UDF. Random fluctuations are filtered out as aberrations and thus the true character of the demand is preserved. Visibly different values of actual demand as compared with stored values of a UDF, for the same sampling interval and outdoor temperature, may raise a flag that something unusual is happening. The magnitude of the difference may distinguish between random deviations (a low-magnitude difference, i.e., a transient spike) or some more significant event (a high-magnitude difference).

In the example described above, the UDF is preferably a two-dimensional colored map showing typical past utility demands for particular weather situations during a day. The two-dimensional UDF's of FIGS. 4 and 5 will typically be sufficient to render the utility demand character.

FIG. 6 is a simplified black-and-white example of a three-dimensional utility demand footprint corresponding to the two-dimensional utility demand footprint of FIG. 4

If desired, a three-dimensional UDF diagram can be created as shown in FIG. 6. The three-dimensional UDF portrays a colored three-dimensional surface created over the matrix structure (coloration not shown). The 3-D surface is a suitable (e.g., piece-wise linear or spline) surface generated by single points representing the matrix elements. In this example the X-coordinate of the point is the sequence number of the time-in-day interval and the Y-coordinate is the discretized outdoor temperature. The Z-coordinate is the value of the matrix element and represents utility demands, e.g., electricity demand in kWh. The color of each pixel is assigned according to a user-defined color palette as previously described. Typically the three-dimensional diagram is utilized only when the two-dimensional diagram cannot describe the demand character clearly enough.

Several footprint classes may be created: for example, seasonal footprints describe the utility demands in each season (winter, summer, transition between two seasons, etc.); type-of-day footprints characterize separately the demand in weekend days and working days.

The UDF as described herein projects typical utility demands in different time-in-day (sampling) intervals and weather conditions onto one diagram. It shows how the utility demand depends on weather, particularly temperature, if it is independent on the time of day, if the utility demand is constant, or if it evolves over time, and it allows analysis of what the behavior of this system was in extreme weather conditions.

The present application may also be used to examine the character of slow utility demand changes. In such cases, a footprint is generated at the beginning of a relevant footprint interval and diagrams are stored periodically during footprint interval. For example, a summer footprint can begin to be generated in April and at the end of each week (starting in June) the UDF's for that week can be stored, numbered by the week number. In October all the stored charts can be recalled, ordered by their week numbers, and displayed as an animated sequence. Animation may reveal changes in demand that occurred during the monitored period. Animation of the stored diagrams, in sequence, allows a user to visualize the evolution of the utility demand over the period of interest. Pure comparison of static charts is telling, but animation can allow visualization of emerging changes in demand patterns, visible as color changes in UDF, in a much clearer and effective manner.

Figure 7:
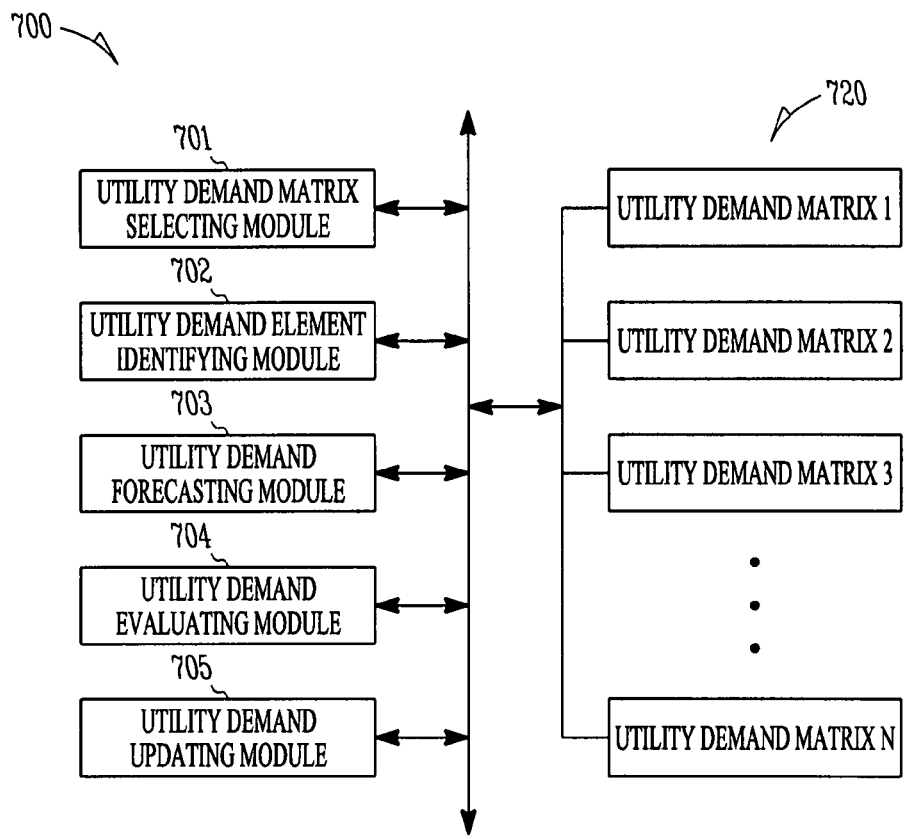
FIG. 7 is a block diagram illustrating modules of a utility forecasting system according to an example embodiment.

FIG. 7 is a block diagram illustrating modules of a utility forecasting system in accordance with an embodiment of the application.

Referring to FIG. 7, a utility demand forecasting system 700 is provided for forecasting utility demand of C for a future time period. The utility consuming entity is, e.g., a building or building complex, like hospitals, office buildings, military bases, campuses, shown as 112, 114, or 118 in FIG. 1. The utility demand may be for example, electricity consumption, natural gas consumption, water consumption, heating consumption, or cooling consumption of the utility consuming entity.

The utility demand forecasting system 700 includes: a set of utility demand matrixes 720, a utility demand matrix selecting module 701, a utility demand element identifying module 702, and a utility demand forecasting module 703. In another embodiment, the utility demand matrix may be in the form of a utility demand tables (not shown in the figures). The tables can be tables typically used in database management systems, e.g., relational database tables.

The set of utility demand matrixes 720 are accessible to the modules of the system, classified by type-of-day, and representing a relation of past utility demand of the entity to time-in-day and outdoor temperature in the vicinity of the utility consuming entity, e.g., 119, 114, or 118 shown in FIG. 1, during the type-of-day. In an embodiment, the type-of-day represents a type of workday, weekday, holiday or weekend during spring, summer, fall or winter as defined by the Gregorian calendar, for example, spring workday, spring weekday, spring holiday, spring weekend, etc. In an embodiment, the time resolution of the time-in-day in the utility demand matrix is typically 15, 30, 45, or 60 minutes, but it may be any other division of a day, reasonable for the utility demand forecasting. The temperature resolution of the outdoor temperature in the utility demand matrix is one degree Centigrade or Fahrenheit. In an embodiment, each row of the utility demand matrix represents utility demands during the same time-in-day, and each column of the utility demand matrix represents utility demands at the same outdoor temperature. In another embodiment, each row of the utility demand matrix represents utility demands at the same outdoor temperature, and each column of the utility demand matrix represents utility demands during the same time-in-day. In some embodiments, the set of utility demand matrixes 720 may be stored in a storage of the system 700, for example, in a tape, hard disk, CD ROM, and database. Various software or hardware products may be used to access data stored in the utility demand matrixes 720, for example, an input/output device, database management system (DBMS), application program interface (API), ACCESS, SQL, and PL/SQL. In other embodiments, the set of utility demand matrixes 720 may be accessed from a resource outside the system 700. For example, the set of utility demand matrixes 720 may be accessed as an output of another system, or obtained through internet.

The utility demand matrix selecting module 701 is used to select a utility demand matrix from the set of utility demand matrixes 720 as a function of a future date. For example, provided the future date is Jul. 18, 2007 (Wednesday), the utility demand matrix selecting module 701 will select, from the set of utility demand matrixes 720, a utility demand matrix including utility demand statistical data on summer workdays. However, provided the future date is Jul. 22, 2007 (Sunday), the utility demand matrix selecting module 701 will select, from the set of utility demand matrixes 720, a utility demand matrix including utility demand statistical data on summer weekends.

The utility demand element identifying module 702 is used to identify the utility demand element from the selected utility demand matrix as a function of a future time-in-day and expected outdoor temperature. In some embodiments, the future expected outdoor temperature is derived from an input (e.g., through an input device or a network), or from other systems accessible to the utility demand forecasting system 700. In an embodiment, in the situation of forecasting near future utility demand for a utility consuming entity, a temperature value from a source of weather forecast (e.g., TV, radio, or internet) can be used as the future expected outdoor temperature.

The utility demand forecasting module 703 is used to forecast the utility demand of the utility consuming entity for the future time period as a function of the identified utility demand element.

In some embodiments, the system 700 also includes a utility demand evaluating module 704, and a utility demand updating module 705. Even if the utility demand matrix may be built once and used for some time on, the better and more reliable forecasts are generated with the utility demand matrix, which is updated each time new data record is available. The utility demand evaluating module 704 may be used to evaluate the characteristics of the utility demand matrix to determine whether the utility demand matrix is stationary or nonstationary. The utility demand matrix is stationary if it shows a flat looking series, without trends and periodic fluctuations. The utility demand matrix is nonstationary if it shows sudden jumps or faster or slower trends. The selection of parameters for creating and updating the utility demand matrix depends on the characteristics of the energy demand matrix. If the utility demand matrix is nonstationary, the utility demand matrix should adapt itself faster to changes, and therefore new data is given higher weight compared to past data. If the utility demand matrix is stationary, the utility demand matrix is relatively stable, and therefore new data is given the same weight as past data. Different weighting is realized by choosing different exponential smoothing alpha coefficient term (between 0 and 1) in the utility demand matrix updating procedure.

In one of the above mentioned matrix configuration, when each row of the utility demand matrix represents utility demands during the same time-in-day, and each column of the utility demand matrix represents utility demands at the same outdoor temperature, if the forecasted temperature is not covered by the matrix row, that is if an empty element is found (e.g. if the outdoor temperature is outside the temperature interval covered by the row), an extrapolation or interpolation is performed using several matrix elements closest to the empty element. The simplest extrapolation or interpolation uses an affine function over two nearest elements in the row. Another extrapolation or interpolation may use an affine function obtained from several closest matrix elements by linear regression.

Figure 8:
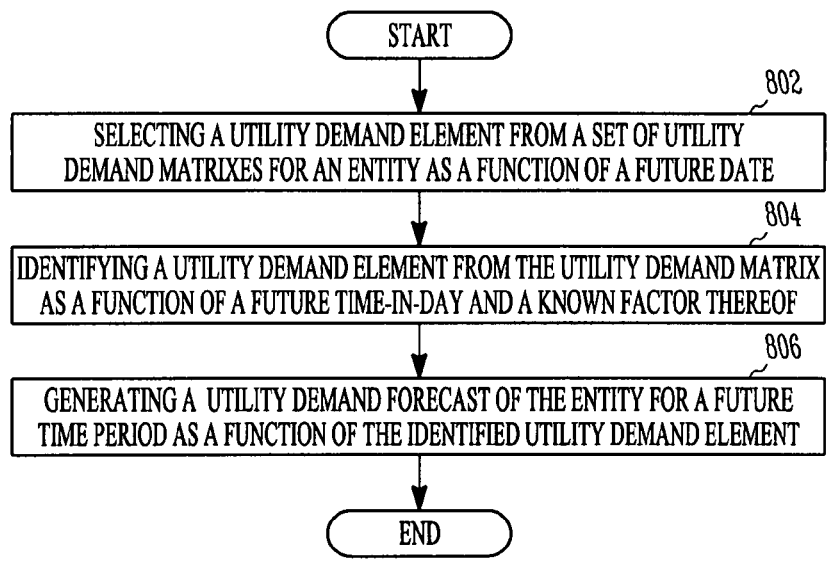
FIG. 8 is a flowchart illustrating a method of forecasting utility demand of a utility consuming entity for a future time according to an example embodiment.

FIG. 8 is a flowchart illustrating a method of forecasting utility demand of a utility consuming entity for a future time, in accordance with an embodiment of the application.

At 802, a utility demand matrix is selected from a set of utility demand matrixes 720 (shown in FIG. 7) as a function of a future date. The set of utility demand matrixes 720 are classified by type-of-day, and represent a relation of past utility demand of the entity to time-in-day and outdoor temperature in the vicinity of the entity during the type-of-day. For example, if the future date is Jul. 18, 2007 (Wednesday), a utility demand matrix representing utility demand statistics on summer working days is selected from the set of utility demand matrixes 720.

At 804, a utility demand element is identified from the utility demand matrix as a function of a future time-in-day and a known factor thereof. In some embodiments, the known factor during the future time-in-day can be a future outdoor temperature, future wind speed, future wind direction, future humidity, or future occupancy during the future time-in-day interval or their suitable combination. For example, at the intersection of the time-in-day (matching the future time-in-day) and outdoor temperature in the utility demand matrix, a utility demand element can be located. In one embodiment, the utility demand element from the utility demand matrix is a historical data of demands influenced by one or more factors selected from the group consisting of past outdoor temperature, past wind speed, past wind direction, past humidity, and past occupancy during a past time-in-day.

At 806, a utility demand forecast of the entity is generated for the future time period as a function of the identified utility demand element. In the utility demand matrix in one embodiment, each utility demand element may correspond solely to a past utility demand value, and this past utility demand value may be used as the forecasting utility demand value.

Figure 9:
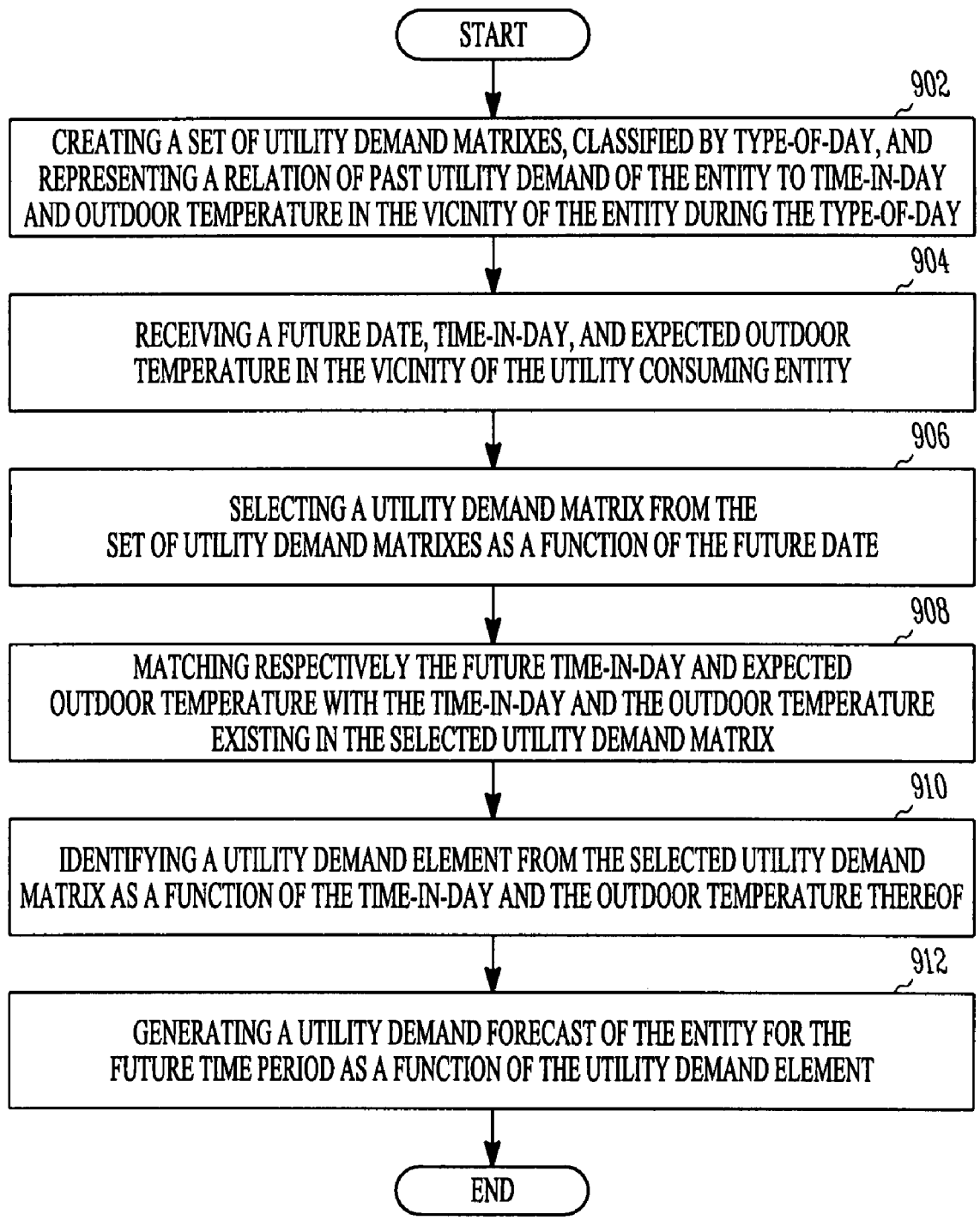
FIG. 9 is a flowchart illustrating a method of forecasting utility demand of a utility consuming entity for a future time according to an example embodiment.

FIG. 9 is a flowchart illustrating a method of forecasting utility demand of a utility consuming entity for a future time, in accordance with another embodiment of the application.

At 902, a set of utility demand matrixes are accessed. The set of utility demand matrixes are classified by type-of-day, and represent a relation of past utility demand of the entity to time-in-day and outdoor temperature in the vicinity of the entity during the type-of-day.

At 904, a future date, time-in-day, and expected outdoor temperature in the vicinity of the utility consuming entity are received.

At 906, a utility demand matrix is selected from the set of utility demand matrixes as a function of the future date.

At 908, the future time-in-day and expected outdoor temperature respectively are matched with the time-in-day and the outdoor temperature existing in the selected utility demand matrix.

At 910, a utility demand element is identified from the selected utility demand matrix as a function of the time-in-day and the outdoor temperature thereof.

At 912, a utility demand forecast of the entity for the future time period is generated as a function of the utility demand element.

Figure 10:
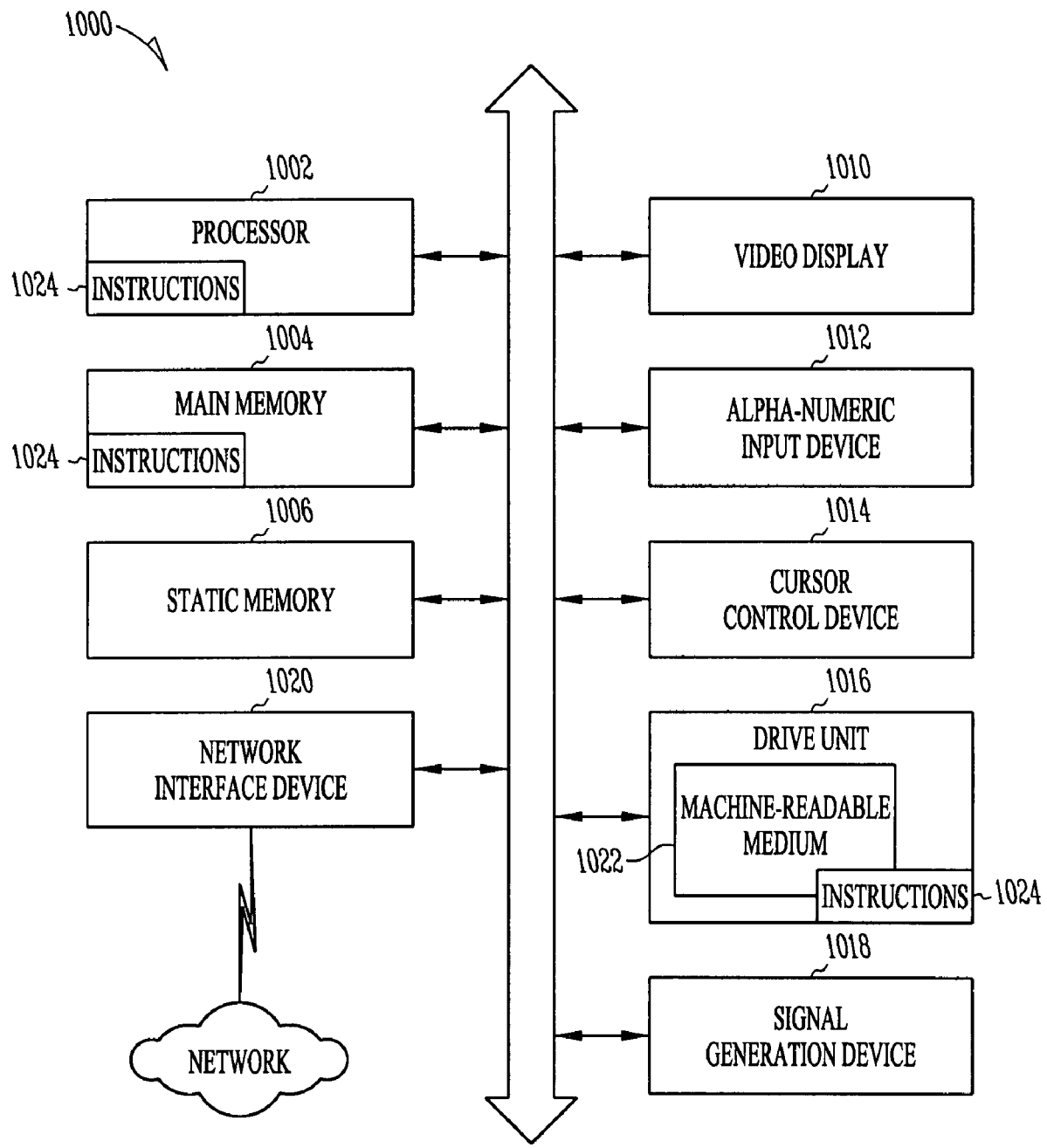
FIG. 10 is a block diagram illustrating a machine in the example form of a computer system 1000, within which a set of sequence of instructions for causing the machine to perform any one of the methodologies discussed herein may be executed.

FIG. 10 is a block diagram illustrating a machine in the example form of a computer system 1000, within which a set of sequence of instructions for causing the machine to perform any one of the methodologies discussed herein may be executed. In further embodiments, elements of the method may be performed by human, such as identifying the proper matrix and a single matrix element for example.

In some embodiments, the machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions that specify actions to be taken by that machine. Further, while only a single machine is illustrated, the term "machine" shall also be taken to include any collection of machines that individually or jointly execute a set of instructions to perform any one or more of the methodologies discussed herein.

The example computer system 1000 includes a processor 1002 (e.g., a central processing unit (CPU) a graphics processing unit (GPU) or both), a main memory 1004 and a static memory 1006, which communicate with each other via a bus 1008. The computer system 1000 may further include a video display unit 1010 (e.g., a liquid crystal display (LCD) or a cathode ray tube (CRT)). The computer system 1000 also includes an alphanumeric input device 1012 (e.g., a keyboard), a cursor control device 1014 (e.g., a mouse), a disk drive unit 1016, a signal generation device 1018 (e.g., a speaker) and a network interface device 1020.

The disk drive unit 1016 includes a machine-readable medium 1022 on which is stored one or more sets of instructions (e.g., software 1024) embodying any one or more of the methodologies or functions described herein. The software 1024 may also reside, completely or at least partially, within the main memory 1004 and/or within the processor 1002 during execution thereof by the computer system 1000, the main memory 1004 and the processor 1002 also constituting machine-readable media.

The software 1024 may further be transmitted or received over a network 1026 via the network interface device 1020.

While the machine-readable medium 1022 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to, solid-state memories, optical and magnetic media.

The above-described steps can be implemented using standard programming techniques. The novelty of the above-described embodiment lies not in the specific programming techniques but in the use of the methods described to achieve the described results. Software programming code which embodies the present application is typically stored in permanent storage. In a client/server environment, such software programming code may be stored in storage associated with a server. The software programming code may be embodied on any of a variety of known media for use with a data processing system, such as a diskette, or hard drive, or CD ROM. The code may be distributed on such media, or may be distributed to users from the memory or storage of one computer system over a network of some type to other computer systems for use by users of such other systems. The techniques and methods for embodying software program code on physical media and/or distributing software code via networks are well known and will not be further discussed herein.

It will be understood that each element of the illustrations, and combinations of elements in the illustrations, can be implemented by general and/or special purpose hardware-based systems that perform the specified functions or steps, or by combinations of general and/or special-purpose hardware and computer instructions.

These program instructions may be provided to a processor to produce a machine, such that the instructions that execute on the processor create means for implementing the functions specified in the illustrations. The computer program instructions may be executed by a processor to cause a series of operational steps to be performed by the processor to produce a computer-implemented process such that the instructions that execute on the processor provide steps for implementing the functions specified in the illustrations. Accordingly, the figures support combinations of means for performing the specified functions, combinations of steps for performing the specified functions, and program instruction means for performing the specified functions.

While there has been described herein the principles of the application, it is to be understood by those skilled in the art that this description is made only by way of example and not as a limitation to the scope of the application. Accordingly, it is intended by the appended claims, to cover all modifications of the application which fall within the true spirit and scope of the application.

The invention claimed is:

1. A machine implemented method of forecasting utility demand of a utility consuming entity for a future time period, the method comprising:
    selecting a utility demand matrix from a set of utility demand matrixes as a function of a future date, wherein the set of utility demand matrixes are classified by type-of-day, and representing a relation of past utility demand of the entity to time-in-day and outdoor temperature in the vicinity of the entity during the type-of-day;
    identifying a utility demand element from the utility demand matrix as a function of a future time-in-day interval and a known factor thereof; and
    generating, by the machine a utility demand forecast of the entity for the future time period as a function of the identified utility demand element.

2. The method of claim 1, wherein the utility consuming entity is a building, or building complex.

3. The method of claim 1, wherein the utility demand is electricity consumption, natural gas consumption, water consumption, heating consumption, or cooling consumption of the utility consuming entity.

4. The method of claim 1, wherein the type-of-day represents a type of workday, weekday, holiday or weekend during spring, summer, fall or winter as defined by the Gregorian calendar.

5. The method of claim 1, wherein a time resolution of the time-in-day in the utility demand matrix is 15, 30, or 60 minutes.

6. The method of claim 1, wherein the utility demand element from the utility demand matrix is a historical data of demand influenced by one or more factors selected from the group consisting of past outdoor temperature, past wind speed, past wind direction, past humidity, and past occupancy during a past time-in-day.

7. The method of claim 1, wherein the known factor is a factor selected from the group consisting of future outdoor temperature, future wind speed, future wind direction, future humidity, and future occupancy during the future time-in-day interval or created from their suitable combination.

8. The method of claim 1, wherein a temperature resolution of the outdoor temperature in the utility demand matrix is one degree Centigrade or Fahrenheit.

9. The method of claim 1, wherein each row of the utility demand matrix represents utility demands during the same time-in-day, and each column of the utility demand matrix represents utility demands at the same outdoor temperature.

10. The method of claim 1, wherein each row of the utility demand matrix represents utility demands at the same outdoor temperature, and each column of the utility demand matrix represents utility demands during the same time-in-day.

11. The method of claim 1, further comprising:
    evaluating whether the selected utility demand matrix is stationary; and
    updating the set of utility demand matrixes each time when new utility demand data is available.

12. The method of claim 11, wherein updating the set of utility demand matrixes is performed by giving a same weight to the new utility data as to a past utility data, if the selected utility demand matrix is found stationary in the evaluating step.

13. The method of claim 11, wherein updating the set of utility demand matrixes is performed by giving a higher weight to the new utility data as compared to a past utility data, if the selected utility demand matrix found nonstationary in the evaluating step.

14. A machine implemented method of forecasting utility demand of a utility consuming entity for a future time period, comprising:
    obtaining access to a set of utility demand matrixes, classified by type-of-day, and representing a relation of past utility demand of the entity to time-in-day and outdoor temperature in the vicinity of the entity during the type-of-day;
    receiving a future date, time-in-day, and expected outdoor temperature in the vicinity of the utility consuming entity;
    selecting a utility demand matrix from the set of utility demand matrixes as a function of the future date;
    matching respectively the future time-in-day and expected outdoor temperature with the time-in-day and the outdoor temperature existing in the selected utility demand matrix;
    identifying a utility demand element from the selected utility demand matrix as a function of the time-in-day and the outdoor temperature thereof; and
    providing, by the machine, a utility demand forecast of the entity for the future time period as a function of the utility demand element.

15. A system of forecasting utility demand of a utility consuming entity for a future time period, comprising:
    means for accessing a set of utility demand matrixes that are classified by type-of-day, and representing a relation of past utility demand of the entity to time-in-day and outdoor temperature in the vicinity of the utility consuming entity during the type-of-day;

a utility demand matrix selecting module, to select a utility demand matrix from the set of utility demand matrixes as a function of a future date;

a utility demand element identifying module, to identify the utility demand element from the selected utility demand matrix as a function of a future time-in-day and expected outdoor temperature; and a machine, to forecast the utility demand of the utility consuming entity for the future time period as a function of the identified utility demand element.

16. The system of claim 15, wherein the type-of-day represents a type of workday, weekday, holiday or weekend during spring, summer, fall or winter as defined by the Gregorian calendar.

17. The system of claim 16, wherein each row of the utility demand matrix represents utility demands during the same time-in-day, and each column of the utility demand matrix represents utility demands at the same outdoor temperature.

18. The system of claim 15, wherein each row of the utility demand matrix represents utility demands at the same outdoor temperature, and each column of the utility demand matrix represents utility demands during the same time-in-day.

19. A computer-readable medium including instructions that, when at least partially performed by a computer in a system, cause the computer to:

to select a utility demand matrix from a set of utility demand matrixes as a function of an input future date, wherein the set of utility demand matrixes is classified by type-of-day, and represents a relation of past utility demand of the entity to time-in-day and outdoor temperature in the vicinity of the entity during the type-of-day;

to identify a utility demand element from the utility demand matrix, by matching respectively a future time-in-day and expected outdoor temperature with the time-in-day and outdoor temperature in the utility demand matrix; and to generate a utility demand forecast of the entity for the future time period as a function of the identified utility demand element.

20. The computer-readable medium of claim 19, further comprising instructions that cause the computer:

to evaluate whether the selected utility demand matrix is stationary; and to update the set of utility demand matrixes each time when new utility demand data is available.

21. The computer-readable medium of claim 20, wherein the instructions cause the computer to update the set of utility demand matrixes by giving a same weight to the new utility data as to a past utility data, if the selected utility demand matrix is found stationary in the evaluating step.

22. The computer-readable medium of claim 20, wherein the instructions cause the computer to update the set of utility demand matrixes by giving a higher weight to the new utility data as compared to a past utility data, if the selected utility demand matrix found nonstationary in the evaluating step.

* * * * *